Figure 1:
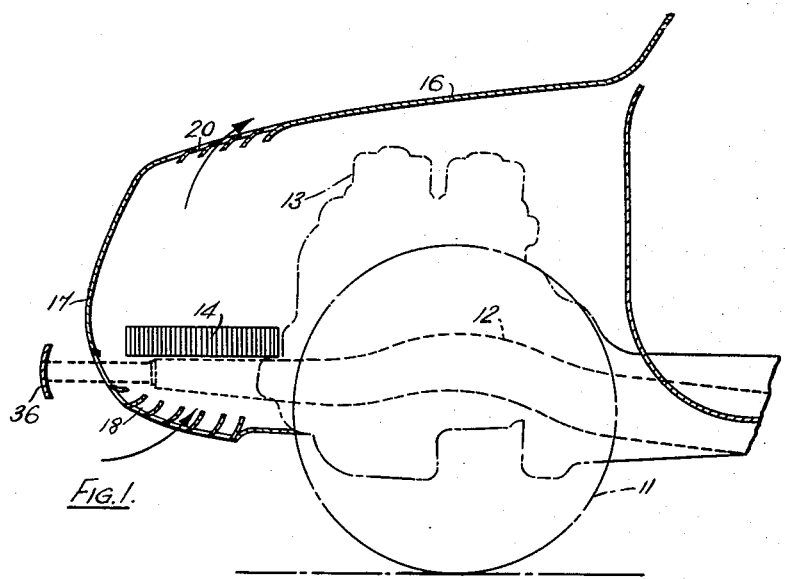
Figure 2:
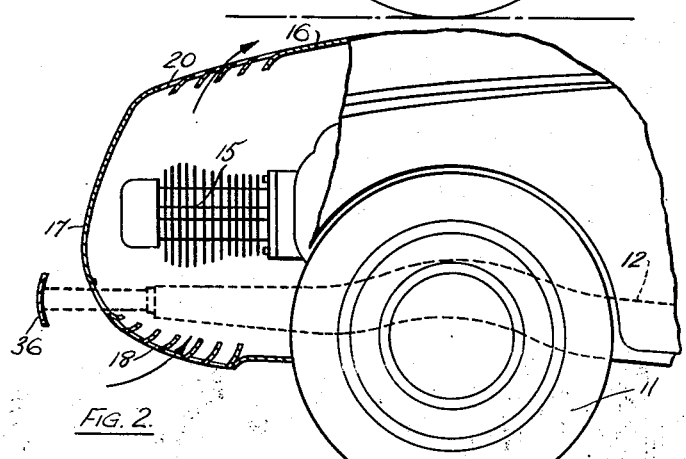

Inventor
Poul Arne Scott-Iversen
by Mawhinney & Mawhinney
Attorneys

Sept. 19, 1944.  P. A. SCOTT-IVERSEN  2,358,663
MOTOR VEHICLE
Filed Oct. 8, 1942   2 Sheets-Sheet 2
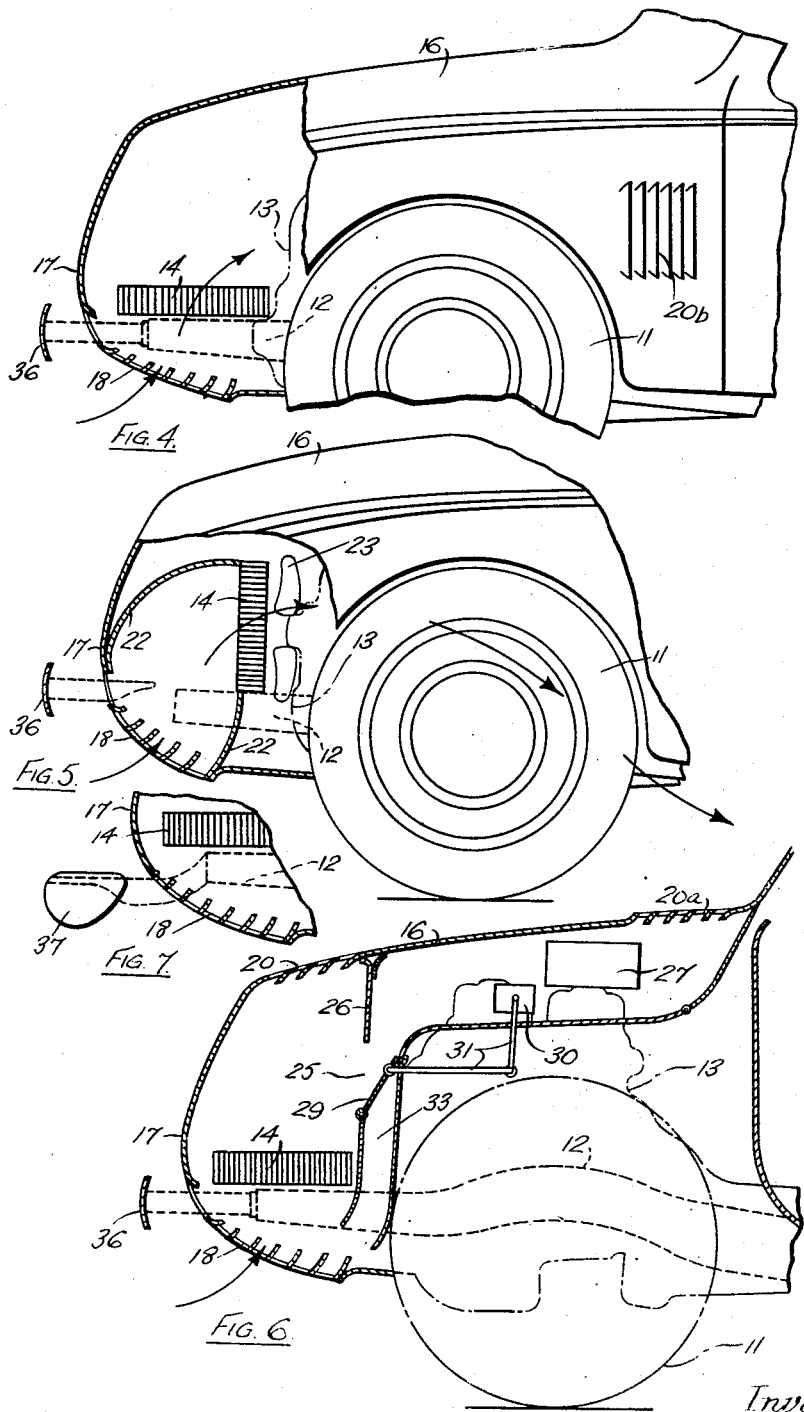

Patented Sept. 19, 1944

2,358,663

UNITED STATES PATENT OFFICE 2,358,663

MOTOR VEHICLE

Poul Arne Scott-Iversen, Leamington Spa, England, assignor to The Rover Company Limited, Chesford Grange, near Kenilworth, Warwickshire, England Application October 8, 1942, Serial No. 461,298
In Great Britain August 20, 1941

8 Claims. (Cl. 180—54)

This invention relates to front-engined motor-vehicles.

Our main object is to provide improvements in the cooling of the engine—whether it be water-cooled or air-cooled.

A further object is to arrange cooling by a flue effect.

A further object is to provide a cowling for the engine having a portion at the front which slopes downwardly and rearwardly from the foremost point of the cowling, and the latter is streamlined sufficiently for the air pressure (when the vehicle is travelling forwardly) to be higher on the area of this rearwardly-sloping portion than elsewhere of the cowling, whilst the said sloping portion has an opening in it at or near the area of maximum pressure through which passes the whole or the main portion of the cooling air for the engine. Obviously the cooling air should be returned to the outside of the cowling at a point of low pressure, preferably at the upper surface of the cowling, either well to the front, or else further back just in front of the vehicle windscreen; or, if desired, the cooling air could be taken further rearwardly and released low down near or towards the rear of the vehicle at a point where the external air pressure is low.

It should be understood that by the term "foremost portion" I do not refer to a lamp, horn, bumper or the like part which may be fitted on the cowling, but to the central portion of the cowling at the front which is tangential with a vertical plane. The cowling or parts of it may be formed integrally with the vehicle body, and may incorporate the front fenders.

In the case of an air-cooled engine the cylinders and as much of the crankcase as necessary will be disposed in the stream of the cooling air—for example, the cylinders may be arranged horizontally thereacross, or inclined at an angle to the horizontal which is well less than a right-angle. In the case of a water-cooled engine the radiator is preferably arranged in the cooling air stream to be horizontal, or inclined as aforesaid.

As will be well understood, the upper portion of the cowling, serving as the engine hood, will preferably be hinged or otherwise adapted so that it can be moved to an out-of-the-way position to provide access to the engine and associated parts, and the front of the cowling may be provided with an imitation grill or the like to simulate the usual form of radiator grill and casing, the lower part of the grill, if desired, acting as an operative grill over the opening for the cooling air. Naturally provision will also be made for the detachment of the lower portion of the cowling when necessary.

A front bumper, if fitted, may be arranged in advance of the cooling air inlet opening, and in this case it may be of curved, streamline shape in cross-section so as to facilitate the flow of air towards the inlet opening without causing unnecessary eddying of the air stream.

By providing an outlet for the cooling air in the upper part of the cowling a flue effect is obtained whereby there will be a flow of cooling air even when the vehicle is stationary with the engine hot or running.

In many conditions I prefer, in the case of a water-cooled engine, to arrange the outlet towards the front of the cowling, and to provide a partition between the radiator and the engine, the former being disposed horizontally in the direct vertical line of air flow. In addition I may provide an opening in the partition, preferably under the control of a thermostat, whereby radiator-heated air may be taken (for example, in winter) from the cooling air stream and directed to the carburettor before being released through the upper part of the cowling at its rear end, i. e., just forwardly of the windscreen. In summer conditons the partition opening may be closed, and some cooling air allowed to bypass the radiator and be delivered to the carburettor and past the cylinder-heads and upper parts of the engine for which additional cooling may be necessary. Preferably the supply of radiator-heated air or unheated air to the carburettor in this way is controlled by a thermostat independently of the season of the year.

These and other objects and advantages of the invention will be better understood if attention be paid to the following description in which reference is made to the accompanying sheets of diagrammatic drawings, wherein:

Figures 1 to 6 are sectional elevational views of different arrangements according to the invention; and Figure 7 is a cross-section through a preferred form of bumper for use in connection therewith.

The same reference characters are applied to denote similar parts throughout the various figures as far as possible.

Thus, 11 represents one of the front road wheels, 12 a part of the chassis-frame, 13 the outline of a water-cooled engine, 14 a radiator therefor, and 15 (Figure 2) the cylinder of an air-cooled engine, whilst round the engine is a bonnet or cowling 16. 17 denotes the foremost portion of this cowling, and from there it slopes downwardly and rearwardly and is provided with an inlet opening 18 through which cooling air can be taken, the external air pressure being higher here than elsewhere of the cowling when the vehicle is travelling forwardly.

In the example of Figure 1 the radiator 14 is arranged horizontally above the inlet opening 18 and the outlet opening 20 is provided substantially directly above the radiator. This applies also to the example of Figure 2, for an air-cooled engine, except that here instead of the radiator there is a horizontal cylinder block. In both these arrangements there is a direct flue effect whereby cooling will take place whilst the vehicle is stationary.

Figure 3:
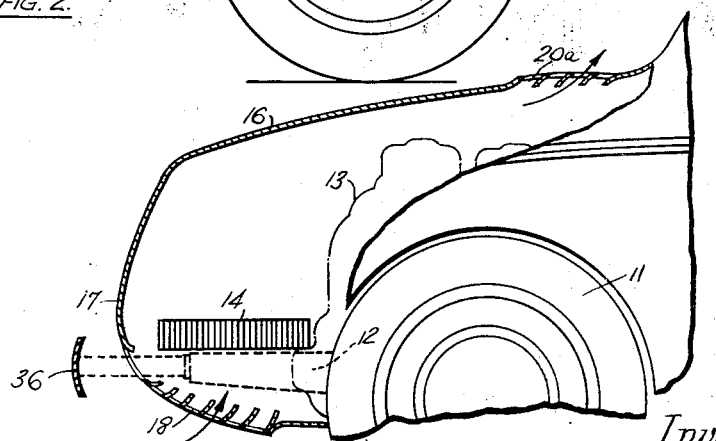

This applies also, to some extent, to the construction of Figure 3, where the outlet opening 20a is placed in the top of the cowling towards the rear thereof, in fact, slightly in advance of the windscreen, whereby air heated by passing through the radiator 14 and past the upper part of the engine will serve for keeping the windscreen free from frost and mist.

In the construction of Figure 4, the outlet opening 20b is in the side panel of the cowling rearwardly of the power unit. In the construction of Figure 5 the radiator 14 is placed vertically, and guiding baffles 22 are provided to direct the air thereto, whilst in this case the power unit is provided with a fan 23 to assist the passage of air through the radiator, such air being exhausted to the rear of the power unit underneath the cowling.

In the construction of Figure 6 there are two outlet openings, 20 and 20a, as in the case of Figures 1 and 3, and whilst the main portion of the cooling air passes vertically upwardly to the outlet 20 some of it can pass through the opening 25 in the partition 26 to the carburettor 27 and thence from the rear outlet opening 20a. The opening 25 in the partition 26 can be controlled by a shutter 29 operable, for example, as illustrated, by means of a thermostat 30 and connecting links 31, so that the opening 25 can be automatically closed when a predetermined temperature is reached. Furthermore, in the construction shown, when the shutter 29 is moved to close the opening 25 it opens a passage 33 which communicates at its lower end with the inlet opening 18 and allows the transmission of air, which has not been heated by the radiator 14, to the carburettor 27.

Figures 1 to 6 all show a normal form of front bumper 36 supported from the chassis-frame; but, if desired, the bumper in any of the constructions shown may be of curved streamline shape, as indicated at 37 in Figure 7, to facilitate the flow of air to the inlet opening 18.

What I claim as my invention and desire to secure by Letters Patent of the United States is:

1. A motor-vehicle having a cowling for the power unit, the cowling having openings in its lower and upper surfaces, the power unit having a radiator to be cooled disposed across the air stream at an inclination to the horizontal which is well less than 90°, in combination with a partition between the radiator and power unit, the partition having a controllable opening therein whereby radiator-heated air may be passed to an appropriate part of the power unit.

2. A motor-vehicle having a cowling for the power unit, the cowling having openings in its lower and upper surfaces, the power unit having a part to be cooled disposed across the air stream at an inclination to the horizontal which is well less than 90°, in combination with a partition having a controllable opening therein whereby radiator-heated air may be passed to an appropriate part of the power unit, the main cooling air being exhausted through the top of the cowling towards the front thereof, and that passed through the partition opening through the top of the cowling towards the rear thereof.

3. A motor-vehicle having a cowling for the power unit, the cowling having openings in its lower and upper surfaces, the power unit having a radiator to be cooled disposed across the air stream at an inclination to the horizontal which is well less than 90°, in combination with a partition having a controllable opening therein whereby radiator-heated air may be passed to an appropriate part of the power unit, the main cooling air being exhausted through the top of the cowling towards the front thereof, and that passed through the partition opening through the top of the cowling towards the rear thereof, said vehicle also having a passage whereby, when the partition opening is closed, some cooling air, which is to be delivered to an appropriate part of the power unit, is allowed to bypass the radiator.

4. A motor-vehicle having a cowling for the power unit, the cowling having openings in its lower and upper surfaces, the power unit having a radiator to be cooled disposed across the air stream at an inclination to the horizontal which is well less than 90°, in combination with a partition having a controllable opening therein whereby radiator-heated air may be passed to an appropriate part of the power unit, the main cooling air being exhausted through the top of the cowling towards the front thereof, and that passed through the partition opening through the top of the cowling towards the rear thereof, said vehicle also having a passage whereby, when the partition opening is closed, some cooling air, which is to be delivered to an appropriate part of the power unit, is allowed to bypass the radiator, and thermostatic means controlling the alternative supplies of air to the said appropriate part.

5. A front-engined motor vehicle having a cowling for the power unit, the cowling having a portion which slopes downwardly and rearwardly from the foremost point of the cowling, said cowling being streamlined sufficiently for the air pressure to be higher on an area of this sloping portion than elsewhere of the cowling, said sloping portion having an opening near the area of maximum pressure through which passes a substantial portion of the cooling air for the power unit, an outlet on said cowling substantially opposite said opening, said power unit having a radiator disposed between said opening and outlet, a partition having a controllable opening therein whereby radiator-heated air may be passed to an appropriate part of the power unit.

6. A vehicle according to claim 5 in which the main cooling air is exhausted through the top of the cowling towards the front thereof, and that passed through the partition opening through the top of the cowling towards the rear thereof.

7. A motor vehicle according to claim 5 in which the main cooling air is exhausted through the top of the cowling towards the front thereof, and that passed through the partition opening through the top of the cowling towards the rear thereof, said vehicle also having a passage whereby, when the partition opening is closed, some cooling air, which is to be delivered to an appropriate part of the power unit is allowed to by-pass the radiator, and thermostatic means controlling the alternative supplies of air to the said appropriate part.

8. The combination with a motor vehicle according to claim 5, of a front bumper in advance of the cooling air inlet, which is of curved streamline shape to facilitate the air flow to the opening.

POUL ARNE SCOTT-IVERSEN.